United States Patent
Schellkes

(10) Patent No.: US 11,221,267 B2
(45) Date of Patent: Jan. 11, 2022

(54) PRESSURE SENSOR DEVICE AND PRESSURE SENSOR WITH A PRESSURE TRANSMITTER PROVIDING PRESSURE OF A FLUID TO BE SENSED TO THE PRESSURE SENSOR DEVICE AND SENSOR

(71) Applicant: Robert Bosch GmbH, Stuttgart (DE)

(72) Inventor: Eckart Schellkes, Kirchentellinsfurt (DE)

(73) Assignee: Robert Bosch GmbH, Stuttgart (DE)

( * ) Notice: Subject to any disclaimer, the term of this patent is extended or adjusted under 35 U.S.C. 154(b) by 399 days.

(21) Appl. No.: 16/336,506

(22) PCT Filed: Sep. 6, 2017

(86) PCT No.: PCT/EP2017/072324
§ 371 (c)(1),
(2) Date: Mar. 26, 2019

(87) PCT Pub. No.: WO2018/059891
PCT Pub. Date: Apr. 5, 2018

(65) Prior Publication Data
US 2021/0285836 A1    Sep. 16, 2021

(30) Foreign Application Priority Data
Sep. 28, 2016  (DE) .......................... 102016218667.1

(51) Int. Cl.
*G01L 19/06* (2006.01)
*G01L 9/00* (2006.01)
*G01L 17/00* (2006.01)

(52) U.S. Cl.
CPC ........ *G01L 19/0627* (2013.01); *G01L 9/0044* (2013.01); *G01L 17/00* (2013.01)

(58) Field of Classification Search
CPC ..... G01L 19/147; G01L 9/0042; G01L 19/04; G01L 9/0054; G01L 9/0072;
(Continued)

(56) References Cited

U.S. PATENT DOCUMENTS 5,625,151 A    4/1997  Yamaguchi
6,591,686 B1   7/2003  Kurtz
(Continued)

FOREIGN PATENT DOCUMENTS

DE    102012000051 A1   7/2012
EP    1275951 A2        1/2003

OTHER PUBLICATIONS

International Search Report dated Nov. 8, 2017 of the corresponding International Application PCT/EP2017/072324 filed Sep. 6, 2017.

*Primary Examiner* — Andre J Allen
(74) *Attorney, Agent, or Firm* — Norton Rose Fulbright US LLP; Gerard Messina

(57) ABSTRACT

A pressure sensor device of a pressure sensor, in particular a low- or medium-pressure sensor, for example a tire-pressure sensor, includes a sensing device that has a sensing side that can be turned toward a sensing environment having a fluid to be sensed; and, directly and/or indirectly on the sensing side, a fluid-pressure transmitting device, through which a fluid pressure of the fluid to be sensed is transmittable to the sensing device.

21 Claims, 2 Drawing Sheets

(58) Field of Classification Search
CPC ... G01L 13/025; G01L 19/14; G01L 19/0038; G01L 19/0084; G01L 9/0055; G01L 9/0075; G01L 19/0069; G01L 9/0052; G01L 9/0073; G01L 19/0092; G01L 19/0618; G01L 19/0645; G01L 19/143; G01L 9/0051; G01L 19/0007; G01L 19/0046; G01L 19/06; G01L 19/0627; G01L 19/0681; G01L 27/002; G01L 9/00; G01L 9/0041; G01L 9/0044; G01L 11/025; G01L 11/04; G01L 19/0023; G01L 19/0672; G01L 19/069; G01L 19/142; G01L 19/145; G01L 19/16; G01L 7/00; G01L 9/0047; G01L 9/06; G01L 9/065; G01L 9/12; G01L 11/02; G01L 13/00; G01L 15/00; G01L 19/0015; G01L 19/003; G01L 19/02; G01L 19/0609; G01L 19/083; G01L 19/10; G01L 19/148; G01L 27/005; G01L 7/08; G01L 7/082; G01L 7/163; G01L 7/166; G01L 9/0045; G01L 9/0048; G01L 9/006; G01L 9/007; G01L 9/0076; G01L 9/04; G01L 9/045; G01L 9/125; G01L 11/00; G01L 17/00; G01L 19/00; G01L 19/0076; G01L 19/08; G01L 19/141; G01L 19/146; G01L 1/142; G01L 1/2262; G01L 1/246; G01L 21/12; G01L 23/16; G01L 27/007; G01L 7/04; G01L 7/063; G01L 7/084; G01L 7/086; G01L 7/16; G01L 9/0002; G01L 9/0007; G01L 9/0016; G01L 9/0019; G01L 9/0022; G01L 9/0027; G01L 9/0033; G01L 9/0039; G01L 9/005; G01L 9/0058; G01L 9/0077; G01L 9/0079; G01L 9/008; G01L 9/0092; G01L 9/0095; G01L 9/025; G01L 9/08; G01L 9/085; G01L 9/105; G01L 9/14; G01L 9/16; G01M 17/02; G01M 17/021; G01M 17/022; G01M 17/027; G01M 17/025; G01M 17/024; G01M 17/10; G01M 1/045; G01M 7/08; G01M 17/0076; G01M 17/013; G01M 17/03; G01M 17/04; G01M 17/06; G01M 17/08; G01M 1/02; G01M 1/12; G01M 1/16; G01M 1/225; G01M 3/04; G01M 3/40; G01M 5/0091; G01M 7/02; G01M 99/00; G01M 99/002; B60C 23/0494; B60C 2019/004; B60C 23/0493; B60C 23/064; B60C 19/00; B60C 23/04; B60C 23/0488; B60C 23/0498; B60C 13/0496; B60C 13/0408; B60C 13/041; B60C 23/0411; B60C 23/06; B60C 23/20; B60C 11/246; B60C 23/0486; B60C 23/061; B60C 11/243; B60C 99/00; B60C 11/0083; B60C 13/003; B60C 2009/2038; B60C 23/004; B60C 23/02; B60C 23/0401; B60C 23/0406; B60C 23/0416; B60C 23/0433; B60C 23/0455; B60C 23/0459; B60C 23/0474; B60C 23/0489; B60C 23/0491; B60C 25/002; B60C 25/005; B60C 25/007; B60C 29/02; B60C 3/04; B60C 99/006; B60C 11/0332; B60C 11/24; B60C 13/001; B60C 13/02; B60C 15/0036; B60C 17/02; B60C 2009/0071; B60C 2009/2022; B60C 2200/02; B60C 2200/06; B60C 2200/065; B60C 23/00; B60C 23/001; B60C 23/003; B60C 23/007; B60C 23/008; B60C 23/0413; B60C 23/0427; B60C 23/0447; B60C 23/0454; B60C 23/0457; B60C 23/0462; B60C 23/0471; B60C 23/0472; B60C 23/0476; B60C 23/0479; B60C 23/0483; B60C 23/0484; B60C 23/065; B60C 23/066; B60C 23/10; B60C 25/0548; B60C 25/056; B60C 25/132; B60C 25/138; B60C 29/005; B60C 9/005; B60C 9/18; B60C 9/1807; B60C 9/20; B60C 9/28

USPC .......................................... 73/700–756, 146.8

See application file for complete search history.

(56) References Cited

U.S. PATENT DOCUMENTS

| | | | |
|---|---|---|---|
| 6,782,754 B1* | 8/2004 | Broden | G01L 19/0645 73/753 |
| 2010/0230766 A1 | 9/2010 | Elian et al. | |
| 2013/0074604 A1* | 3/2013 | Hedtke | G01F 1/36 73/753 |
| 2013/0333440 A1* | 12/2013 | Hedtke | G01L 13/025 73/1.57 |
| 2019/0001765 A1* | 1/2019 | Jordan | B60C 23/006 |
| 2019/0299725 A1* | 10/2019 | Maehara | B60C 23/04 |
| 2020/0254830 A1* | 8/2020 | Sekizawa | G01L 17/00 |

* cited by examiner

PRESSURE SENSOR DEVICE AND PRESSURE SENSOR WITH A PRESSURE TRANSMITTER PROVIDING PRESSURE OF A FLUID TO BE SENSED TO THE PRESSURE SENSOR DEVICE AND SENSOR

CROSS-REFERENCE TO RELATED APPLICATIONS

The present application is the national stage of International Pat. App. No. PCT/EP2017/072324 filed Sep. 6, 2017, and claims priority under 35 U.S.C. § 119 to DE 10 2016 218 667.1, filed in the Federal Republic of Germany on Sep. 28, 2016, the content of each of which are incorporated herein by reference in their entireties.

FIELD OF THE INVENTION

The present invention relates to a pressure sensor device for a pressure sensor, in particular a low- or medium-pressure sensor. The present invention also relates to a pressure sensor, in particular a low- or medium-pressure sensor, for example, a tire pressure sensor, the pressure sensor having a pressure sensor device according to the present invention. Moreover, the present invention relates to a device, an apparatus, a unit, or a system having a pressure sensor device according to the present invention and/or a pressure sensor according to the present invention.

BACKGROUND

A significant challenge in providing a design and connection technique for a pressure sensor, which requires an access for a fluid to be sensed, is protecting a sensitive structure, such as a sensing diaphragm and/or electronics of the pressure sensor, for example, a bonding pad, from a harmful effect of a gas or a liquid. In the case of a medium-pressure sensor, whose typical pressure range is from ten to 100 bar, and which is used, for example, for sensing a fluid pressure in a transmission fluid, an approach provides for an encapsulated oil enclosure, thus for a mechanical access.

In the case of an encapsulated oil enclosure, an encapsulated, oil-filled chamber is positioned between a sensing diaphragm and a fluid to be sensed and keeps the fluid to be sensed away from the sensing diaphragm. At the same time, it transmits a pressure to be measured. A design and connection technique therefor is complex since it is necessary to encapsulate a chamber oil in closed housing, for example, a steel housing, having a comparatively thin end face.

U.S. Pat. Nos. 5,625,151 A and 6,591,686 B1, for example, teach encapsulated oil enclosures.

SUMMARY

Example embodiments of the present invention provide an improved pressure sensor, in particular an improved low- or medium-pressure sensor, or an improved pressure sensor device for a pressure sensor, in particular a low- or medium-pressure sensor. It is intended here that the pressure sensor or the pressure sensor device be able to receive information about a fluid pressure in comparatively undamped form. It is also intended that the pressure sensor or the pressure sensor device according to the present invention have a simple design and be cost-effective to manufacture, assemble and maintain.

Example embodiments are directed to a pressure sensor device provided for a pressure sensor, in particular a low- or medium-pressure sensor; to a pressure sensor, in particular a low- or medium-pressure sensor, for example, of a tire-pressure sensor having a pressure sensor device having a pressure sensor device according to the present invention; and to a device, an apparatus, a unit, or a system having a pressure sensor device according to the present invention and/or a pressure sensor according to the present invention.

A pressure sensor device according to the present invention includes a sensing device, that has a sensing side that can be turned toward a sensing environment having a fluid to be sensed; directly and/or indirectly on the sensing side, a fluid-pressure transmitting device being provided, through which a fluid pressure, as the fluid pressure of the fluid to be sensed, can be transmitted to the sensing device. In this case, the pressure sensor device and/or the fluid-pressure transmitting device thereof can be designed in such a way that the fluid pressure is transmittable by a transmission fluid in the fluid-pressure transmitting device to the sensing side (sensing diaphragm).

A solid body of the fluid-pressure transmitting device can thereby be essentially dimensionally stable, incompressible, and/or thermally stable in response to pressures and/or temperatures occurring in the sensing environment. A dimensionally stable solid body of the fluid-pressure transmitting device (see below) preferably includes a solid body that essentially is not subject to any deformation and preferably is essentially incompressible in response to no or to a (fluid) mechanical action. In this case, the solid body can essentially have an affinity to and/or be neutral (physically and/or chemically inert, i.e., inactive) to the transmission fluid and/or the fluid to be sensed. In addition, the solid body can, if indicated, essentially lack an affinity to (e.g., avoid) the fluid to be sensed. In this case, the solid body can essentially be hydrophobic and/or lipophilic.

Moreover, the solid body of the fluid-pressure transmitting device can be constituted in such a way that the fluid-pressure transmitting device does not release (adhesion) the transmission fluid at least in response to pressures and/or temperatures occurring in the sensing environment. Moreover, the solid body can include a porous (in particular, open-pored) and/or sponge-like and fluid pervious structure. Furthermore, it can be constituted in such a way that comparatively large voids (open pores, open cells, etc.) in the solid body are smaller than the comparatively small particles present in the fluid to be sensed. Moreover, the solid body can be constituted in such a way that it or the fluid-pressure transmitting device can be or is provided on the sensing device by a typical or conventional fitting method for electronic chips, such as, for example, bonding, brazing, insertion (snapping into place), etc. In particular, the solid body can be a ceramic, a metal, a metal alloy, a plastic, or a stone.

The following explanations refer, for example, to the porous and/or sponge-like and fluid pervious structure of the solid body (without transmission fluid) of the fluid-pressure transmitting device or of the fluid-pressure transmitting device itself. As a ceramic, boron nitride (preferably, but not limited thereto), zirconium oxide, aluminum oxide, titanium oxide, chromium oxide, etc., can be used, for example; naturally, a mixture thereof being usable. A corresponding foam and/or sponge thereof, for example, based on aluminum, nickel, etc., can be used as a metal or metal alloy. A glass, for example, pumice, as the case can be, sandstone, etc., is suited as a stone. A pseudo alloy, such as nickel graphite, etc. can also be used. —These substances can be used here as a mixture and/or stratification.

The transmission fluid for the fluid-pressure transmitting device or of the fluid-pressure transmitting device can be eventually incompressible and/or thermally stable in response to pressures and/or temperatures occurring in the sensing environment. In this case, the transmission fluid can essentially have an affinity to the solid body of the fluid-pressure transmitting device. The transmission fluid can also be essentially neutral (physically and/or chemically inert, i.e., inactive) to the solid body and/or the fluid to be sensed. Moreover, the transmission fluid can, if indicated, essentially lack an affinity to (e.g., avoid) the fluid to be sensed; i.e., essentially be immiscible therewith.

If the fluid to be sensed is water, for example, then an oil, for example, is suited for the transmission fluid (see also below), or, if indicated, vice versa. If the fluid to be sensed is air, for example), then an oil, for example, or, in some instances, even water is suited for the transmission fluid. Furthermore, the transmission fluid can essentially be hydrophobic and/or lipophilic or lipophobic. Suited as a transmission fluid is, for example, water, an oil, a solution, an organic or inorganic solvent, etc. The transmission fluid can also be referred to as an enclosure fluid, the solid body as an enclosure body, and the fluid-pressure transmitting device as a fluid enclosure.

In particular, it is preferred, naturally only where a substance selection makes it comparatively easily possible, in the first place, that the solid body have an affinity to or, in the second place, be neutral to the transmission fluid; in the first place, the solid body is neutral to or, in the second place, has an affinity to or, in the third place, lacks an affinity to the fluid to be sensed (position one and two can change places depending on an application case); in the first place, the transmission fluid is neutral or, in the second place, has an affinity to the fluid to be sensed (depending on an application case, these positions can change places). It is also preferred here that both the transmission fluid, as well as the fluid to be sensed be hydrophobic.

The solid body of the fluid-pressure transmitting device is preferably a porous, open-pored and/or sponge-like and fluid pervious solid body. Here, the solid body can be formed in such a way that the transmission fluid introducible into the same, essentially remains in the porous, open-pored, and/or sponge-like and fluid pervious solid body independently, without any external influence. This means that the solid body of the fluid-pressure transmitting device is formed in such a way that the transmission fluid is preferably simply introducible into the same (fluid pervious) and mainly or essentially remains in the same without any external influence (sponge-like, adhesion).

In addition, the solid body is preferably formed in such a way that a fluid pressure can be communicated (fluid pervious) through it by the transmission fluid, from one side of the solid body to another side thereof, preferably a diametral side. In the case of a porous solid body, it is preferred here that, pores or cells of the solid body be in mutual fluid communication, i.e., that it be open-pored. This holds analogously for the fluid-pressure transmitting device. A porous ceramic, such as boron nitrite, or a foam or sponge of a metal or metal alloy (also see above) can be used for this, in particular.

Between the sensing device and the fluid-pressure transmitting device, a coupling gap or a coupling layer is configurable or configured, within which the transmission fluid can be or is provided, or within which the transmission fluid is configurable or configured. In this case, the transmission fluid of the coupling gap or of the coupling layer can be brought into or be in fluid communication with the transmission fluid of the fluid-pressure transmitting device. The coupling gap or the coupling layer is preferably configurable or configured here between a sensing diaphragm (see below) of the sensing device and of the fluid-pressure transmitting device. Preferred layer thicknesses for the coupling layers are smaller 10-20 µm. Thicker coupling layers, thus, a coupling gap, for example, can naturally be used.

In addition to a coupling gap or a coupling layer (in fluid communication therewith) or, alternatively, (substituting the same), a fluid channel, a fluid reservoir, etc. is configurable in the pressure sensor device. The fluid-pressure transmitting device or the solid body thereof can rest by an outer rim (sections thereof or fully circumferentially) on the sensing device, preferably away from the sensing diaphragm thereof, and is preferably connectible or connected there (mechanical connection, see below), for example, by a partially or fully circumferential adhesive bonding. Other joining techniques (brazing, plugging, screw-mounting, as the case can be, using a seal, etc.) can naturally be used. In accordance with the present invention, the sensing device can be in the form of a sensor chip, in particular a conventional pressure sensor chip, for example.

The sensing device preferably has a sensing diaphragm, above and/or upon which the solid body or the fluid-pressure transmitting device can be or is provided; except for a conventional connection to the sensor device etc., the sensing diaphragm being able to be brought into or being in fluid communication merely with the transmission fluid of the fluid-pressure transmitting device. As already explained above, for example, this is preferably accomplished via the configurable or configured coupling gap or the configurable or configured coupling layer having the transmission fluid. Here, the pressure sensor device is adapted in such a way that the fluid to be sensed is a gaseous and/or liquid fluid. This can be air, an aerosol, water, an oil, a solution, an organic or inorganic solvent, a suspension, an emulsion, etc.

In example embodiments of the present invention, the sensing device and the solid body or the fluid-pressure transmitting device can be separately formed in two pieces or contiguously joined in two parts. The pressure sensor device can be constituted to be integratable or integrated in a chip package by a typical or conventional integration or enveloping method for electronic chips, such as encapsulating, (transfer) molding, etc. Here, the solid body or the fluid-pressure transmitting device or the pressure sensor device can be partially or fully integrated in a carrier (cover, housing, etc.).

A mechanical connection between the sensing device and the solid body or the fluid-pressure transmitting device can be fluid impervious, in particular at least impervious to the transmission fluid. This means if the mechanical connection is formed to be impervious to the transmission fluid (liquid), then it can be pervious to the fluid (for example, a gas) to be sensed since, inter alia, the transmission fluid seals or isolates the mechanical connection from the fluid to be sensed.

In the case of the pressure sensor according to the present invention, a transmission fluid is provided in a solid body of a fluid-pressure transmitting device of the pressure sensor device thereof. Here, a fill level of the transmission fluid in the solid body is preferably lower than a maximum fill level of the transmission fluid in the solid body or in the fluid-pressure transmitting device. A sensing environment of the pressure sensor can be an interior space, an (exterior) space or the atmosphere. Here, the fluid (fluid pressure) to be sensed can be brought into a fluid communication with the transmission fluid. The pressure sensor device or merely the solid body or the fluid-pressure transmitting device of the pressure sensor can be provided partially or fully on/in a carrier. This means that, if indicated, the sensing device can be free-standing. Here, the carrier can be a housing, a cover, etc.

In addition, an outer rim of the solid body or of the fluid-pressure transmitting device and a material of the carrier (inner rim) can be formed as an infiltrated composite. During the manufacture thereof, it is preferred here that a liquid or viscous mass (setting compound) for the carrier penetrate into the outer rim of the fluid-pressure transmitting device and, together with the outer rim, thereby form an infiltrated composite that is fluid impervious to the transmission fluid and preferably also to the fluid to be sensed. Here, besides the fluid-mechanical interface thereof, the pressure sensor device can include the mechanical connection.

The pressure sensor can be provided or configured via a sealing element on/in an inventive device, an inventive apparatus, an inventive unit, or an inventive system. In addition, the pressure sensor can be configured to sense an internal pressure, an external pressure (room pressure), or an atmospheric pressure of the device, the apparatus, the unit, or of the system. Moreover, the pressure sensor can be connected fluid-mechanically via a mechanical connection, for example, a connection piece, to the device, the apparatus, the unit or the system.

The present invention is explained in greater detail in the following on the basis of example embodiments with reference to the enclosed schematic and not-to-scale drawings. Sections, elements, components, units, schemata, and/or components, which have an identical, univocal, or analog design and/or function are characterized by the same reference numerals. A feature can be designed to be positive, i.e., present, or negative, i.e., absent, a negative feature not being explicitly clarified as a feature when emphasis is not placed on the absence thereof.

Described features (section, element, component, unit, schematic, component, etc.) can be used not only in a manner indicated, but also in another manner (in isolation, abstract, replacement, addition, alone, omission, etc.). In particular, on the basis of a reference numeral and a feature assigned thereto or vice versa, it is possible to replace, add, or omit a described feature. Moreover, a feature in a patent claim can thereby be interpreted and/or specified in greater detail.

The described features (in view of the (mostly unknown) related art) can also be interpreted as optional features; i.e., each feature can be understood to be optional, arbitrary, or preferred, thus interpreted as a non-binding feature. It is thus possible to eliminate a feature, in some instances, inclusive of the peripheral characteristics thereof, from an example embodiment; this feature then being transferable to a generalized idea of the present invention. The absence of a feature (negative feature) in an example embodiment indicates that the feature is optional for the present invention. Moreover, in the context of a specific concept, a generic concept for the feature is able to be read too (in some instances, further hierarchical structuring in subgenus, section, etc.), whereby, for example, taking functional equivalency and/or equivalence into account, a generalization of a or of this feature is possible.

DETAILED DESCRIPTION

Figure 1:
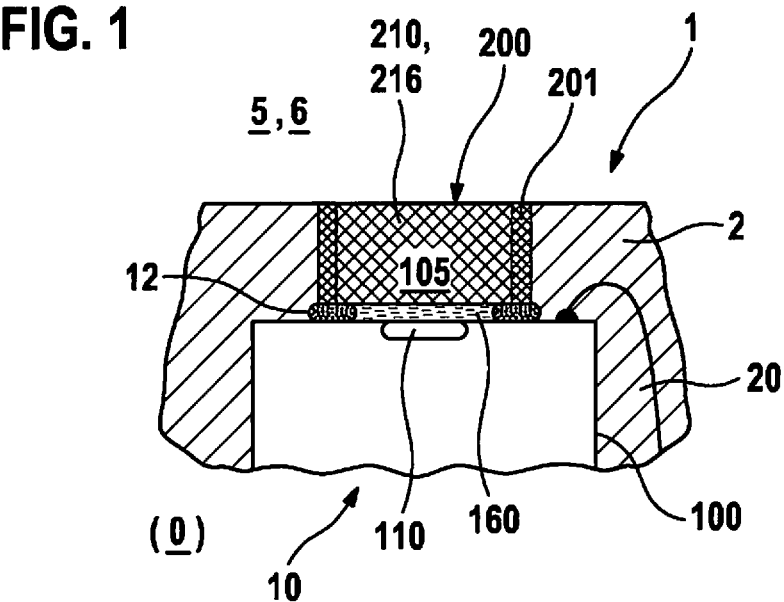
FIG. 1 is a sectional view of a fully encapsulated sensor device according to an example embodiment of the present invention.

The present invention is explained in greater detail in the following on the basis of example embodiments of a sensor. However, the present invention is not limited to such example embodiments or to the example embodiments explained in the following; but rather is of fundamental nature, so that it is applicable to all sensors in the context of the present invention. Although the present invention is described and illustrated in detail by preferred example embodiments, it is not limited by the described example embodiments. Other variations can be derived therefrom, without departing from the scope of protection of the present invention.

In each case, the drawing shows a sensor device 10 or a pressure sensor device 10 for a sensor 1 or a pressure sensor 1 for a device 0, an apparatus 0, a unit 0, a system 0, etc. Sensor device 10 includes a sensing device 100, such as a sensor chip 100, for example, in particular a pressure sensor chip 100, and a transmitting device 200 according to the present invention or a fluid-pressure transmitting device 200 according to the present invention. Sensing device 100 and transmitting device 200 or a solid body 210, in particular a porous, open-pored, sponge-like, and/or fluid pervious solid body 210, of transmitting device 200 are preferably attached to one another by a mechanical connection 12. Such a mechanical connection 12 can be a bonded connection 12, a brazed joint 12, a clamp connection 12, etc.

Sensor device 10, sensing device 100, and/or transmitting device 200 can be provided here on/in a chip package 2 or be fully or partially integrated therein. On sensing side 105 thereof, sensing device 100 has transmitting device 200. Here, sensing side 105 of sensing device 100 faces a sensing environment 5 having a liquid and/or gaseous fluid 6 to be sensed. Sensing environment 5 can be an interior space, an (exterior) space or the atmosphere. This also means (compare also below) that transmitting device 200, apart from transmitting fluid 216 thereof (see below), is placed in sensing environment 5, projects into the same or is provided thereon, which is to be understood in a fluid-mechanical sense.

Transmitting device 200 preferably has a porous, open-pored, and/or sponge-like and fluid pervious structure (substance) or a porous, open-pored, and/or sponge-like and fluid pervious solid body 210 (substance), which can be provided or is provided on sensing device 100. Apart from an attachment, the structure or solid body 210, can be provided or is provided here directly on sensing device 100. In order that sensing device 100 be able to sense a signal, in particular a fluid pressure on sensing side 105 thereof or sensing environment 5, because of transmitting device 200, transmitting device 200 is partially or fully filled with a transmission fluid 216.

This structure or solid body 210 preferably has one or a plurality of the following properties (mainly or essentially): porous (having chambers, essentially for receiving transmission fluid 216 and for transmitting the fluid pressure); open-pored (essentially for transmitting the fluid pressure); sponge-like (essentially for holding back transmission fluid 216); fluid pervious (essentially for transmitting the fluid pressure); incompressible (essentially for the non-dissipative transmission of the fluid pressure); thermally stable (durability of transmission fluid 216); hydrophobic (to avoid an accumulation of or a substitution with water over a lifetime of sensor 1); and/or lipophilic (absorptive for a transmission fluid 216 and/or (very) readily wettable by an oil (transmission fluid 216)).

Substances, which at least partially have these properties, are indicated above. The substance, for example, porous boron nitrite (EP 0 076 731 A2), on the one hand, is in (fluid-) mechanical contact with a sensing diaphragm 110 of sensing device 100 via a coupling gap 160 or a coupling layer 160 and, on the other hand, is open to sensing fluid 6, so that a change in pressure in fluid 6 to be sensed is fluid-mechanically transmittable to transmission fluid 216 in transmitting device 200. Transmission fluid 216 is preferably to be selected in such a way that a direct contact with fluid 6 to be sensed does not produce any unwanted physical or chemical interactions.

Transmitting device 200 is preferably selected in a way that enables it to be fitted on sensing device 100 using a typical fitting technique, which can be carried out using an annular adhesive bond, for example. In addition, transmitting device 200 is preferably to be selected in a way that enables it to be integrated in chip package 2 using customary methods, such as (transfer) molding. In accordance with the present invention, there is no longer a need for hermetic, i.e., gas-tight, encapsulation since transmitting device 200 preferably essentially no longer releases transmission fluid 216 thereof.

In a use or an operation of sensor 1, a transmitting device 200 and transmission fluid 216 thereof come in a direct fluid-mechanical contact with a fluid 6 to be sensed. Potentially different filling levels of transmitting device 200 can be compensated by transmission fluid 216. Transmitting device 200 is preferably designed to keep particles from fluid 6 to be sensed away from sensing device 100 and to be clogged by a preferably large number of comparatively (very) small pores or channels only in the case of a comparatively (very) high loading with the smallest particles.

FIG. 1 shows a design of a pressure sensor 1 or of a pressure sensor device 10 for a fully molded, i.e., designed, shaped, molded-in, encapsulated, and/or compression-molded carrier 20, which can be formed as a housing 20. A carrier 20 that is partially molded relative to pressure-sensor device 10 can naturally be used. A sensing device 100 of pressure-sensor device 10 has a fluid-pressure transmitting device 200 fitted on sensing side 105 thereof. A preferably porous solid body 210 of fluid-pressure transmitting device 200 is fixed in position by a mechanical connection 12, which can be an annular adhesive bonding 12, via a sensing diaphragm 110 of sensing device 100 in such a way that a comparatively thin coupling gap 160 remains free between solid body 210 and sensing diaphragm 110. A coupling layer 160 can naturally be used.

Figure 2:
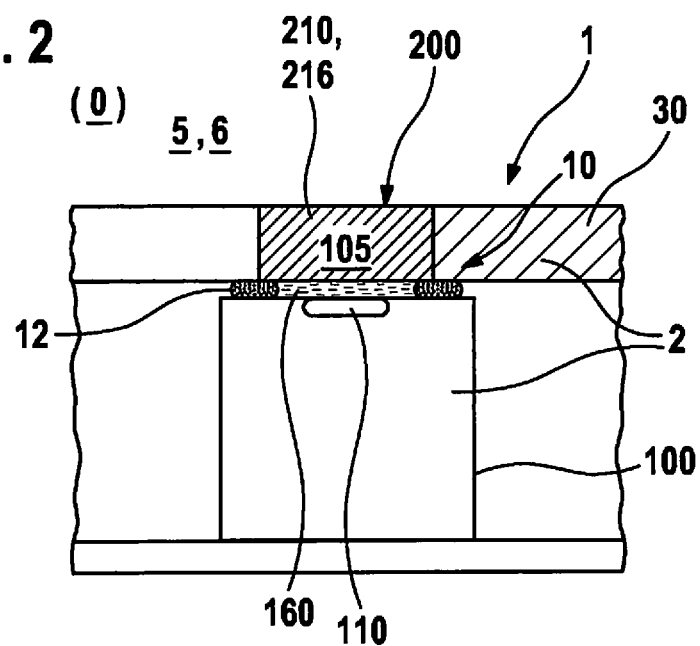
FIG. 2 is a sectional view of a partially encapsulated sensor device according to an example embodiment of the present invention.

Coupling gap 160 or coupling layer 160 between solid body 210 and sensing diaphragm 110 is filled with a transmission fluid 216, which can be an oil 216, and, together with a same transmission fluid 216 in solid body 210, ensures a pressure transmission to sensing diaphragm 110 of pressure-sensor device 10, without solid body 210 resting on sensing diaphragm 110 or being or coming in direct mechanical contact therewith. This means that solid body 210 is spaced apart from sensing diaphragm 110 and, except for mechanical connection 12, is preferably directly secured at/to sensing device 100. In addition, as illustrated in FIG. 2, sensing device 100 can be free-standing, and merely solid body 210 molded into a carrier 30 that can be configured as a cover 30. It is self-evident that a carrier 30 that is partially molded relative to sensing device 100 can be used.

Sensing device 100 or a sensor chip 100 or a pressure sensor chip 100 can, in particular, be fully encapsulation molded. To achieve a design having fully encapsulation molded sensing device 100 and fully encapsulation molded solid body 210, sensing device 100 and solid body 210 can be integrated in housing 20 or carrier 20. A customary method can be used, for example, to encapsulate mold porous solid body 210 into housing 20. This is configurable during the process, if indicated, without an additional measure or, if indicated, without an additional method step. Furthermore, FIG. 1 shows such an example embodiment having a molded housing 20 without a cover 30.

During, but not exclusively during the process, a region 201 is formed at the meeting rims, within which a liquid plastic penetrates into solid body 210 and is able to cure there during a molding process. A mechanically stable and a preferably at least liquid-tight bond is thereby created that can be formed as an infiltrated composite 201. Infiltrated composite 201 thereby includes a preferably fully circumferential outer rim of solid body 210 and an inner rim of housing 20 or carrier 20 that has penetrated therein.

In addition, sensing device 100 or sensor chip 100 or pressure sensor chip 100 can, in particular, be provided in a free-standing form. To achieve a design having a free-standing sensing device 100, merely solid body 210 can be integrated into cover 30 or carrier 30. Subsequently to the manufacture thereof, cover 30 can be adhesively bonded to sensing device 100 by an annular adhesive bonding 12, so that, here as well, comparatively thin coupling gap 160 (transmission fluid 216) is formed between solid body 210 and sensing diaphragm 110. A coupling layer 160 having transmission fluid 216 can naturally be used, in turn. Infiltrated composite 201 thereby includes a preferably fully circumferential outer rim of solid body 210 and an inner rim of cover 30 or carrier 30 that has penetrated therein. Furthermore, FIG. 2 also shows such an example embodiment having a molded cover 30.

Figure 3:
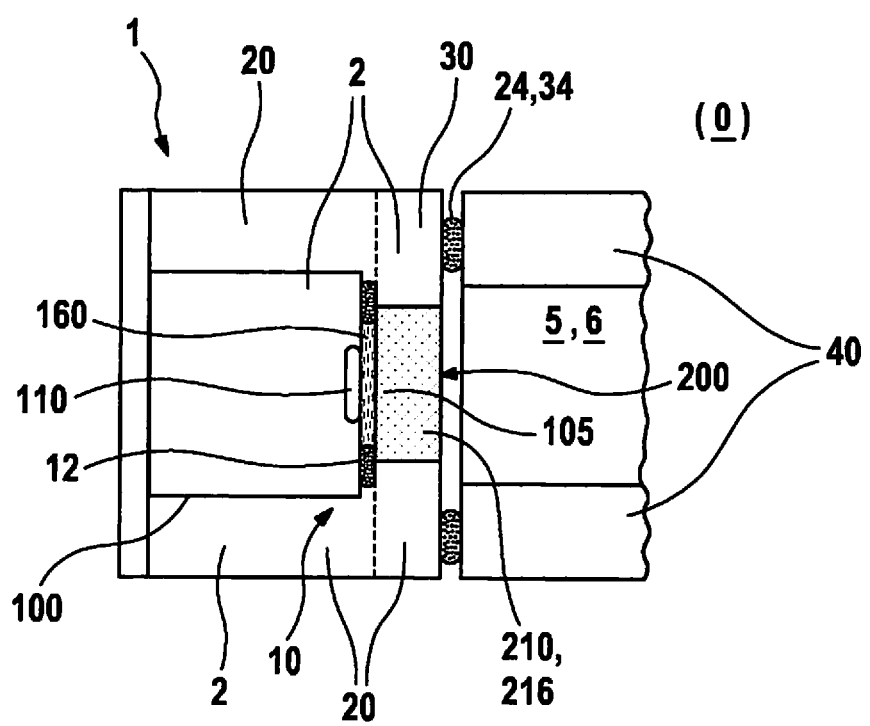
FIG. 3 is a sectional view of a sensor that is attached fluid-mechanically to a connection according to an example embodiment of the present invention.

FIG. 3 shows exemplarily a possible use of sensor 1 or of pressure sensor 1 from FIGS. 1 and 2. Sensor 1 or pressure sensor 1 from FIG. 1 or 2 is mechanically and fluid-mechanically connected via a seal or sealing element 24 (FIG. 1), 34 (FIG. 2) to a connection 40, which can be formed as a connection piece 40, for example. Connection 40 delivers fluid 6 to be sensed to a sensing side 105 of sensor 1 or of pressure sensor 1 having preferably oil-filled (transmission fluid 216) porous solid body 210. Connection 40 can thereby be a connection piece 40 for sensing a fluid pressure in an oil (fluid 6 to be sensed), for example, transmission fluid. Numerous other uses of fluid pressure monitoring systems, systems for measuring/sensing/detecting fluid pressures, etc., for example, for air, water, oil, etc., for example, a tire-pressure monitoring system, an ambient-pressure measuring system, etc., are naturally possible.

What is claimed is:

1. A pressure sensor device comprising:
   a sensor that includes a sensing side; and
   a fluid-pressure transmitter situated directly or indirectly on the sensing side of the sensor and through which fluid pressure of a fluid to be sensed, which is in a sensing environment external to the sensor and the fluid-pressure transmitter, is transmittable to the sensor;
   wherein the fluid-pressure transmitter includes a solid body, and at least one of the following three features (a)-(c):

(a) the solid body is fluid-pervious and is at least one of porous and spongy;
(b) the solid body is hydrophobic; and
(c) the solid body is lipophilic.

2. The pressure sensor device of claim 1, wherein the fluid pressure is transmittable to the sensor by a transmission fluid in the fluid-pressure transmitter.

3. The pressure sensor device of claim 2, wherein the transmission fluid at least one of:
is at least one of incompressible by at least one of pressures and temperatures occurring in the sensing environment;
is hydrophobic;
is lipophobic; and
includes water, an oil, a solution, an organic solvent, or an inorganic solvent.

4. The pressure sensor device of claim 2, wherein a coupling gap or layer that is between the sensor and the fluid-pressure transmitter is arranged to receive transmission fluid that is in fluid communication with the transmission fluid in the fluid-pressure transmitter.

5. The pressure sensor device of claim 1, wherein the fluid-pressure transmitter includes the solid body, and the solid body is provided on the sensor by an electronic chip fitting method and/or includes a ceramic, a metal, a metal alloy, a plastic, or a stone.

6. The pressure sensor device of claim 1, wherein the fluid pressure is transmittable to the sensor by a transmission fluid in the fluid-pressure transmitter, the fluid-pressure transmitter includes the solid body, and the solid body is structured such that the transmission fluid is introducible into the solid body to remain in the solid body without being externally influenced.

7. The pressure sensor device of claim 5, wherein the fluid-pressure transmitter includes the solid body, the fluid pressure is transmittable to the sensor by a transmission fluid in the fluid-pressure transmitter, and the sensing diaphragm is arranged for fluid communication with the transmission fluid in the fluid-pressure transmitter.

8. The pressure sensor device of claim 1, wherein the fluid-pressure transmitter includes the solid body and at least one of:
the sensor and the solid body are separately formed in two pieces or contiguously joined in two parts;
a mechanical connection between the sensor and the solid body is fluid impervious to a transmission fluid by which the fluid pressure is transmittable to the sensor; and
the solid body is integrated in a carrier.

9. The pressure sensor device of claim 1, wherein at least one of:
the sensor and the fluid-pressure transmitter are separately formed in two pieces or contiguously joined in two parts;
the pressure sensor device is integratable in a chip package by an integration method or enveloping method for electronic chips;
a mechanical connection between the sensor and the fluid-pressure transmitter is fluid impervious to a transmission fluid by which the fluid pressure is transmittable to the sensor; and
the fluid-pressure transmitter or the pressure sensor device is integrated in a carrier.

10. The pressure sensor device of claim 1, wherein the fluid-pressure transmitter includes the solid body, and the pressure sensor device further comprises a transmission fluid in the solid body.

11. The pressure sensor device of claim 10, wherein a fill level of the transmission fluid is lower than a maximum fill level of the transmission fluid in the solid body.

12. A tire-pressure monitoring system comprising a pressure sensor device, the pressure sensor device including:
a sensor that includes a sensing side; and
a fluid-pressure transmitter situated directly or indirectly on the sensing side of the sensor and through which fluid pressure of a fluid to be sensed, which is in a sensing environment external to the sensor and the fluid-pressure transmitter, is transmittable to the sensor;
wherein the fluid-pressure transmitter includes a solid body, and at least one of the following three features (a)-(c):
(a) the solid body is fluid-pervious and is at least one of porous and spongy;
(b) the solid body is hydrophobic; and
(c) the solid body is lipophilic.

13. The pressure sensor device of claim 1, wherein the fluid-pressure transmitter includes the fluid-pervious solid body that is at least one of porous and spongy.

14. The pressure sensor device of claim 13, wherein the solid body includes therein a transmission fluid by which the fluid pressure of the fluid to be sensed is transmittable to the sensor.

15. The pressure sensor device of claim 13, wherein the sensor includes a diaphragm and the fluid-pressure transmitter is arranged to transmit the fluid pressure of the fluid to be sensed from a first side of the fluid-pressure transmitter that faces away from the sensor to the diaphragm, which is arranged at a second side of the fluid-pressure transmitter, the second side being opposite to the first side.

16. The pressure sensor device of claim 1, wherein the fluid-pressure transmitter includes the hydrophobic solid body.

17. The pressure sensor device of claim 1, wherein the fluid-pressure transmitter includes the lipophilic solid body.

18. A system comprising:
a pressure sensor device; and
a sensing environment that is external to the pressure sensor device;
wherein:
the pressure sensor device includes (I) a sensor that includes a sensing side and (II) a fluid-pressure transmitter that includes a solid body, is situated directly or indirectly on the sensing side of the sensor, and via which fluid pressure of a fluid to be sensed, which is in the sensing environment, is transmittable to the sensor; and
at least one of the following three features (a)-(c):
(a) the solid body includes therein a transmission fluid by which the fluid pressure is transmittable to the sensor, and the solid body is configured such that the transmission fluid is not released from the solid body in response to the at least one of the pressures and temperatures occurring in the sensing environment;
(b) the solid body is at least one of dimensionally stable, incompressible, and thermally stable in response to at least one of pressures and temperatures occurring in the sensing environment; and
(c) the solid body includes voids, large ones of which are smaller than small particles of particles present in the fluid to be sensed.

19. The system of claim 18, wherein the solid body includes therein the transmission fluid by which the fluid pressure is transmittable to the sensor, and the solid body is configured such that the transmission fluid is not released from the solid body in response to the at least one of the pressures and temperatures occurring in the sensing environment.

20. The system of claim 18, wherein the solid body is at least one of dimensionally stable, incompressible, and thermally stable in response to the at least one of pressures and temperatures occurring in the sensing environment.

21. The pressure sensor device of claim 18, wherein the fluid-pressure transmitter includes the solid body that includes the voids, the large ones of which are smaller than the small particles of particles present in the fluid to be sensed.

\* \* \* \* \*